(12) United States Patent
Gabara et al.

(10) Patent No.: US 6,721,376 B2
(45) Date of Patent: Apr. 13, 2004

(54) SIGNAL ENCODING FOR TRANSMISSION OF MULTIPLE DIGITAL SIGNALS OVER SINGLE PHYSICAL MEDIUM

(75) Inventors: Thaddeus John Gabara, Murray Hill, NJ (US); Syed Aon Mujtaba, Berkeley Heights, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/213,225

(22) Filed: Aug. 6, 2002

(65) Prior Publication Data

US 2002/0186792 A1 Dec. 12, 2002

Related U.S. Application Data

(62) Division of application No. 09/363,524, filed on Jul. 29, 1999, now Pat. No. 6,456,666.

(51) Int. Cl.[7] .................................................. H09B 1/10
(52) U.S. Cl. ......................... 375/350; 375/349; 341/70
(58) Field of Search ................................ 375/316, 325, 375/340, 361, 259, 377, 260, 349, 350; 341/50, 68, 70, 71, 73, 69, 100

(56) References Cited

U.S. PATENT DOCUMENTS

| | | | |
|---|---|---|---|
| 4,425,666 A | * | 1/1984 | Groth, Jr. .................. 375/275 |
| 4,524,462 A | | 6/1985 | Cottatelucci ................ 455/608 |
| 4,716,563 A | | 12/1987 | Roust ....................... 370/110.4 |
| 4,736,464 A | | 4/1988 | Tanson ........................ 455/608 |
| 4,972,408 A | | 11/1990 | Le Bihan Herve et al. ... 370/84 |
| 5,390,185 A | | 2/1995 | Hooijmans et al. ........... 370/98 |
| 5,633,892 A | | 5/1997 | Krisher ........................ 375/286 |
| 5,903,546 A | * | 5/1999 | Ikeda et al. .................. 370/232 |
| 5,914,982 A | * | 6/1999 | Bjarnason et al. .......... 375/222 |
| 5,949,819 A | * | 9/1999 | Bjarnason et al. .......... 375/222 |
| 6,108,379 A | * | 8/2000 | Shikakura et al. .......... 375/240 |
| 6,178,330 B1 | * | 1/2001 | Alberty et al. ............ 455/452.2 |
| 6,404,819 B1 | * | 6/2002 | Gehlot ........................ 375/242 |
| 6,507,611 B1 | * | 1/2003 | Imai et al. .................. 375/222 |

* cited by examiner

*Primary Examiner*—Jean B. Corrielus
(74) *Attorney, Agent, or Firm*—Richard J. Botos

(57) ABSTRACT

Two or more digital signals are encoded using two or more respective line codes. The line codes are chosen in conjunction with the data rates of the digital signals such that the encoded signals are substantially orthogonal to each other in the frequency domain. As such, the two or more encoded signals may be combined and transmitted via a single physical medium with little or no interference. A transmitter for encoding and transmitting the digital signals contains line coders for encoding the digital signals and a combiner for combining the encoded signals for transmission via a single physical medium. A receiver for receiving and decoding the combined encoded signal contains filters for extracting the individual encoded signals and line decoders for decoding the individual encoded signals to generate the original digital data signals.

16 Claims, 5 Drawing Sheets

SIGNAL ENCODING FOR TRANSMISSION OF MULTIPLE DIGITAL SIGNALS OVER SINGLE PHYSICAL MEDIUM

This is a divisional of application Ser. No. 09/363,524, filed on Jul. 29, 1999 now Pat. No. 6,456,666.

FIELD OF THE INVENTION

The present invention relates generally to data transmission. More particularly, the present invention relates to signal encoding to allow for the transmission of multiple digital signals via a single physical medium.

BACKGROUND OF THE INVENTION

The amount of information that can be transmitted between two devices is generally limited by the bandwidth of the physical medium interconnecting the two devices. For example, the amount of digital data that may be transmitted between two integrated circuits (IC) is limited by the bandwidth of the physical wire connecting the ICs.

It is often desirable to send two or more simultaneous data streams between two devices along a single physical medium connecting the devices. For example, a first data stream may be a high rate primary signal and a second data stream may be a low rate secondary signal. The secondary signal may be used, for example, to transmit control information between the devices. However, as described above, the bandwidth of the physical connection between the devices limits the amount of data that may be transmitted.

Data encoding techniques exist which allow for the transmission of both a primary digital signal and a secondary digital signal over a single physical medium. For example, U.S. Pat. No. 4,716,563 entitled Demodulation of Auxiliary Low Frequency Channels in Digital Transmission Systems and U.S. Pat. No. 4,972,408 entitled Method and Apparatus for Combining and For Separating a Low Data Rate Digital Channel with or from the High Data Rate Digital Channel of a Transmission Link, both disclose techniques for transmitting a low data rate auxiliary digital signal along with a high data rate primary digital signal on a physical transmission medium. Both techniques modulate the low data rate signal so that it may be transmitted along the single transmission medium without interfering with the primary signal. One disadvantage of such techniques is that they require modulation of the low data rate signal at the transmitter and demodulation of the low data rate signal at the receiver, thus increasing the cost of the overall system.

SUMMARY OF THE INVENTION

In accordance with the invention, two or more digital signals are encoded using two or more respective line codes, such that the power spectral densities of the encoded signals are substantially orthogonal in the frequency domain. Since the power spectral densities of the encoded signals are substantially orthogonal, the encoded signals may be combined and transmitted via a single physical medium with little or no interference. Appropriate line codes are chosen taking into account the data rates of the two or more digital signals in order to achieve the desired orthogonality.

In accordance with one embodiment of the invention, a low data rate digital signal and a high data rate digital signal are transmitted via a single physical medium. The low data rate digital signal is encoded using a polar non-return-to zero line code and the high data rate digital signal is encoded using a Manchester line code. Due to the characteristics of these line codes, the encoded low data rate digital signal will have high power spectral density in a low frequency range and the encoded high data rate digital signal will have high power spectral density in a high frequency range. Further, the encoded low data rate digital signal will have low power spectral density in the high frequency range and the encoded high data rate digital signal will have low power spectral density in a low frequency range. As such, the power spectral densities of the encoded signals are substantially orthogonal and the encoded signals may be combined and transmitted via a single physical medium with little or no interference.

In accordance with another embodiment of the invention, a first high data rate digital signal, a second low data rate digital signal, and a third low data rate digital signal may be line encoded in accordance with the invention and transmitted via a single physical medium. In this embodiment, the first high data rate digital signal is encoded using Manchester line coding, the second low data rate digital signal is encoded using polar non-return-to-zero line coding, and the third low data rate digital signal is encoded using alternate mark inversion line coding. As a result of encoding, the power spectral densities of the encoded signals are substantially orthogonal and the encoded signals may be combined and transmitted via a single physical medium with little or no interference.

In accordance with one embodiment of the invention, a transmitter for encoding the digital signals includes line coders for line encoding received digital signals and a combiner for combining the encoded signals and transmitting the encoded signals via a single physical medium. A receiver for receiving the combined signal includes filters for extracting individual encoded signals and line decoders for receiving the individual encoded signals and decoding them to produce the original digital data signal. Since the line encoded signals have high power spectral densities in different frequency ranges, appropriate filters may be chosen to pass the appropriate encoded signal to the appropriate line decoder.

These and other advantages of the invention will be apparent to those of ordinary skill in the art by reference to the following detailed description and the accompanying drawings.

DETAILED DESCRIPTION

A well known method for the transmission of digital data over a physical medium (e.g. a wire) is the use of line codes. A line code maps the digital levels 1 and 0 to voltage waveforms such that the digital data may be recovered from the signal received at the receiver with minimal error. Many different line codes are known, and each line code has its own distinct characteristics. One such characteristic of line codes is the power spectral density (PSD) which describes the relative power contributed by various frequency components.

In accordance with one embodiment of the invention, a first high data rate digital data signal is encoded using a Manchester line code and a second low data rate digital data signal is encoded using a polar non-return-to-zero (NRZ) line code. Line codes are well known in the art and various line codes in accordance with particular embodiments of the invention will be described briefly herein. For further information on line codes, see *Modern Digital and Analog Communication Systems*, Second Edition, B. P. Lathi, Oxford University Press, 1995, Chapter 3.

Figure 1:
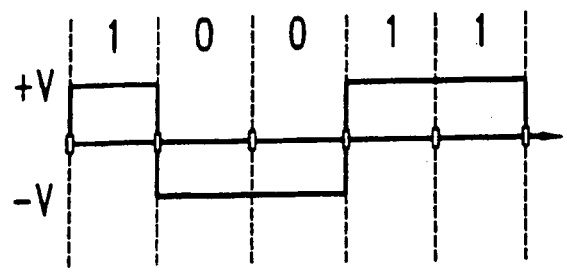
FIG. 1 shows an example waveform for a digital signal encoded using a polar NRZ line code.
Figure 2:
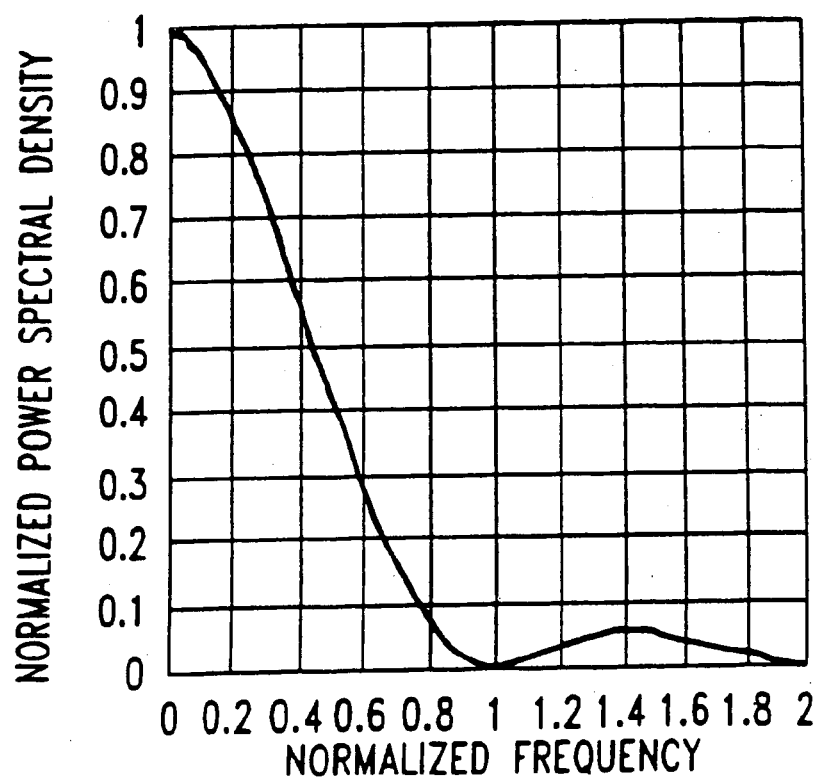
FIG. 2 shown the normalized PSD for a signal encoded using the polar NRZ line code.

In a polar NRZ line code, a digital 1 is encoded as +V volts and a digital 0 is encoded as -V volts. Polar NRZ is a non-return-to-zero code such that the waveform does not return to 0 volts between symbols. An example waveform for the digital signal 10011 encoded using polar NRZ is shown in FIG. 1. FIG. 2 shown the normalized PSD for a signal encoded using the polar NRZ line code. As seen from FIG. 2, the PSD has a significant DC (i.e., 0 frequency) component. Further, for a signaling rate of R bps, a bandwidth null occurs at R Hz.

Figure 3:
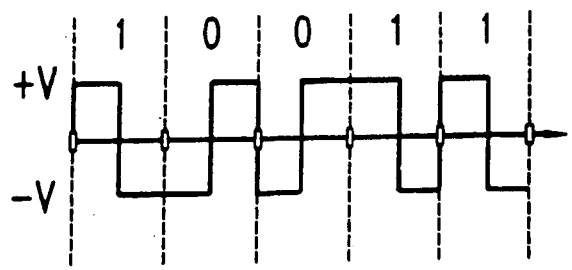
FIG. 3 shows an example waveform for a digital signal encoded using a Manchester line code.
Figure 4:
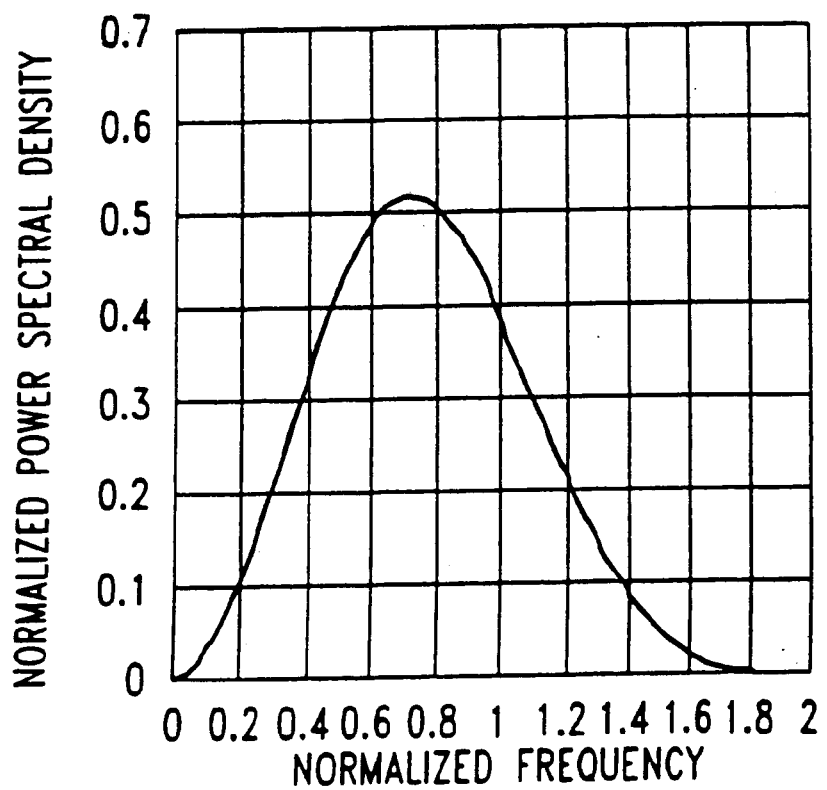
FIG. 4 shown the normalized PSD for a signal encoded using the Manchester line code.

A Manchester line code is a transition line code wherein waveform transitions between +V and -V encode the digital signal. In a Manchester line code, a digital 1 is encoded as a +V→-V transition, and a digital 0 is encoded as a -V→+V transition. An example waveform for the digital signal 10011 encoded using a Manchester line code is shown in FIG. 3. FIG. 4 shown the normalized PSD for a signal encoded using the Manchester line code. As seen from FIG. 4, the PSD has 0 DC component. Further, for a signaling rate of R bps, a bandwidth null occurs at 2R Hz.

Figure 5:
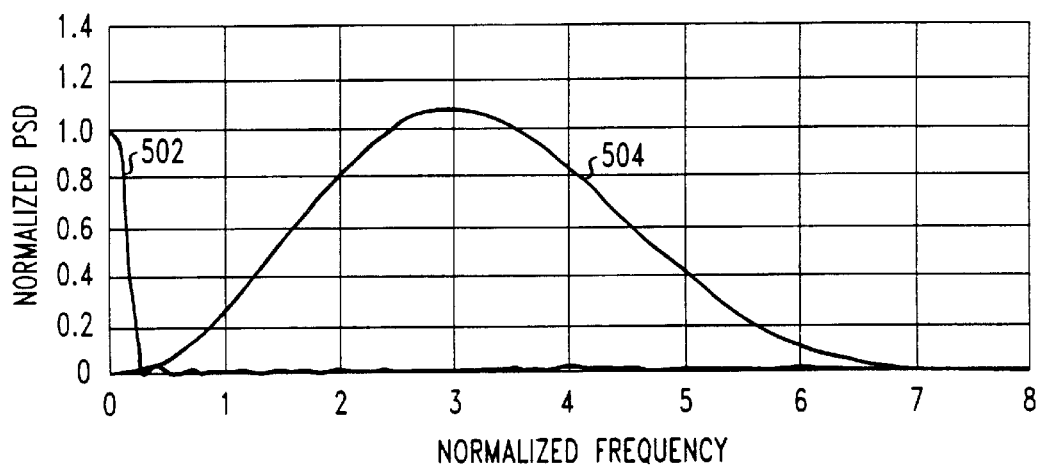
FIG. 5 shows the normalized PSDs for a high data rate digital signal and a low data rate digital signal encoded in accordance with one embodiment of the invention.

In accordance with one embodiment of the invention, a first low data rate digital signal is encoded using the polar NRZ line code, a second high data rate digital signal is encoded using the Manchester line code, and the two encoded signals are combined and transmitted over a single physical transmission medium. Due to the characteristics of the line codes, the PSD's of the encoded signals at the chosen data rates are substantially orthogonal, and thus the two encoded signals may be combined and transmitted via a single physical medium without interference. FIG. 5 shows the normalized PSDs for the encoded signals in accordance with this embodiment of the invention in which a high data rate digital signal at a data rate of 4R is encoded using Manchester encoding and a low data rate digital signal at a data rate of R/4 is encoded using polar NRZ encoding. The PSD for the polar NRZ encoded signal is shown as curve 502 and the PSD for the Manchester encoded signal is shown as curve 504. As can be seen from FIG. 5, the high data rate Manchester encoded signal has a low PSD in the low frequency range, and the low data rate polar NRZ encoded signal has a high PSD in the same low frequency range. Further, the high data rate Manchester encoded signal has a high PSD in the high frequency range, and the low data rate polar NRZ encoded signal has a low PSD in the same high frequency range. Because of the substantial orthogonality of the PSDs of the two encoded signals, the signals may be combined and transmitted simultaneously over the same physical medium with little or no interference.

Figure 6:
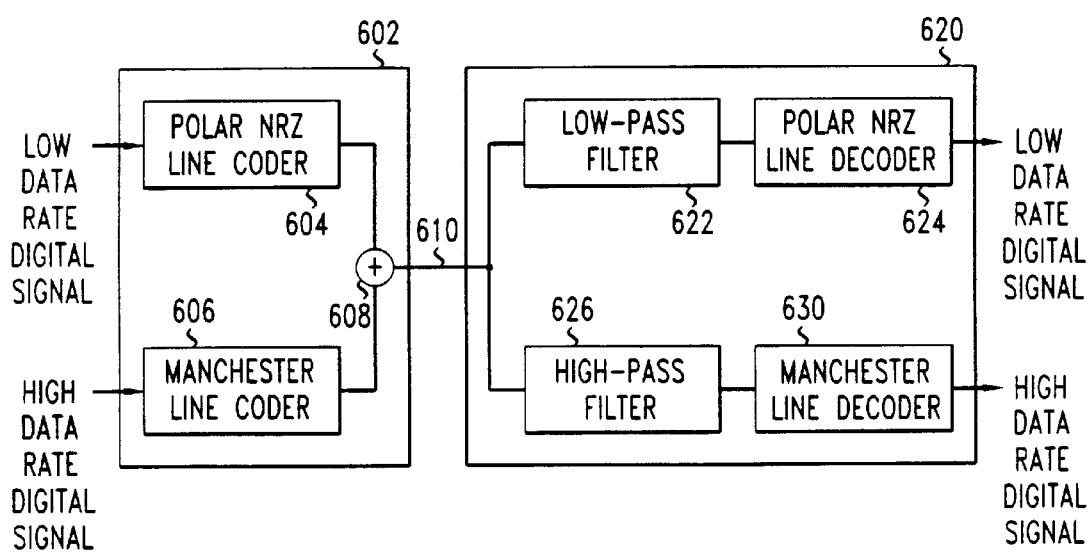
FIG. 6 shows a system for transmitting and receiving digital signals in accordance with one embodiment of the invention.

One embodiment of a system for practicing the invention as described in accordance with FIG. 5 is shown in FIG. 6. A transmitter 602 receives a low data rate digital signal and a high data rate digital signal. The low data rate digital signal is encoded by polar NRZ line coder 604 and the high data rate digital signal is encoded by Manchester line coder 606. The two encoded signals are combined by combiner 608 and transmitted via a wire 610 to receiver 620. At the receiver 620 the signal is split and provided to a low-pass filter 622 and a high-pass filter 626. The low-pass filter 622 passes the signal in the low frequency range. As described above in conjunction with FIG. 5, the high data rate encoded signal has a low PSD in the low frequency range, and the low data rate encoded signal has a high PSD in the same low frequency range. Thus, the output of the low-pass filter 622 is provided to a polar NRZ line decoder 624 for decoding. The polar NRZ line decoder 624 will output the low data rate digital signal. Similarly, the high-pass filter 626 passes the signal in the high frequency range. As described above in conjunction with FIG. 5, the high data rate encoded signal has a high PSD in the high frequency range, and the low data rate encoded signal has a low PSD in the same high frequency range. Thus, the output of the high-pass filter 626 is provided to a Manchester line decoder 630 for decoding. The Manchester line decoder 630 outputs the high data rate digital signal.

If appropriate data rates and line codes are chosen, then it is possible to transmit more than two signals over a single physical medium in accordance with the invention. An embodiment in which three signals are transmitted over a single medium will now be described. In accordance with this embodiment, a first high data rate digital signal is encoded using a Manchester line code, a second low data rate digital signal is encoded using polar non-return-to-zero (NRZ) line code, and a third low data rate digital signal is encoded using an alternate mark inversion (AMI) line code.

Figure 7:
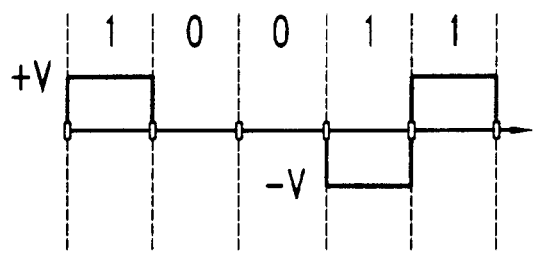
FIG. 7 shows an example waveform for a digital signal encoded using an alternate mark inversion line code.
Figure 8:
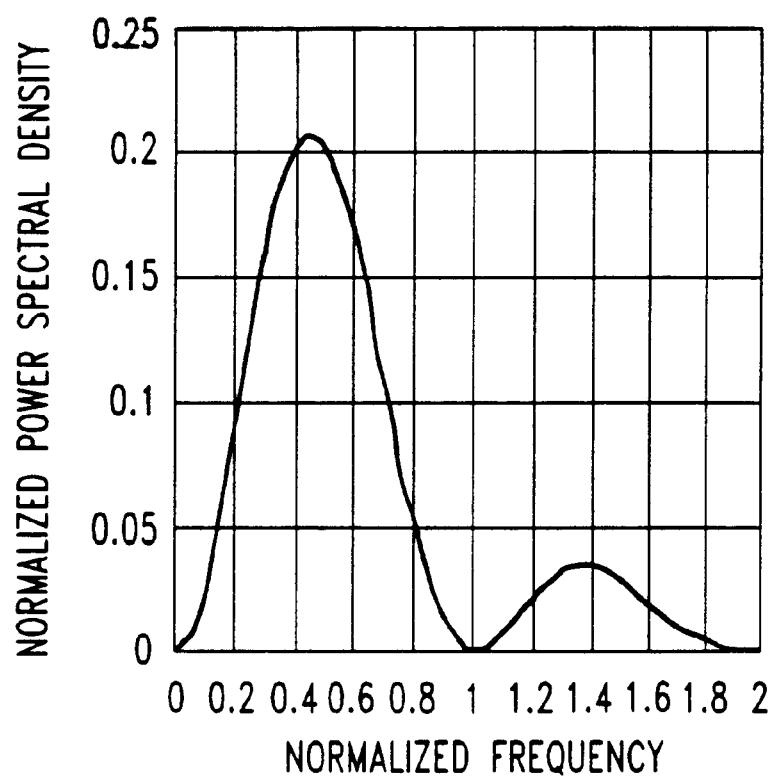
FIG. 8 shown the normalized PSD for a signal encoded using the alternate mark inversion line code.

In an AMI line code, a digital 1 is alternately encoded as +V and -V and a digital 0 is encoded as 0 V. An example waveform for the digital signal 10011 encoded using an AMI line code is shown in FIG. 7. FIG. 8 shown the normalized PSD for a signal encoded using the AMI line code. As seen from FIG. 8, the PSD has 0 DC component. Further, for a signaling rate of R bps, a bandwidth null occurs at R Hz. The AMI line code is well known and is further described in *Modern Digital and Analog Communication Systems*, Second Edition, B. P. Lathi, Oxford University Press, 1995, p. 171.

Figure 9:
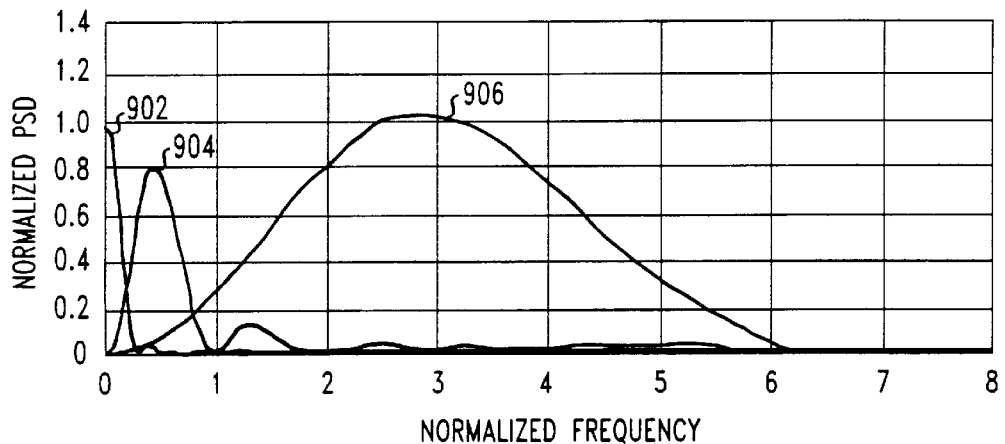
FIG. 9 shows the normalized PSDs for a first high data rate digital signal, a second low data rate digital signal, and a third low data rate digital signal encoded in accordance with one embodiment of the invention.

In accordance with an embodiment of the invention, a first low data rate digital signal is encoded using the polar NRZ line code, a second low data rate digital signal is encoded using the AMI line code, a third high data rate digital signal is encoded using the Manchester line code, and three encoded signals are combined and transmitted over a single transmission medium. Due to the characteristics of the line codes in combination with chosen data rates, the PSD's of the encoded signals are substantially orthogonal, and thus the three encoded signals may be transmitted via a single medium without interference. FIG. 9 shows the normalized PSDs for the encoded signals in accordance with an embodiment of the invention in which a first low data rate digital signal at a data rate of R/4 is encoded using polar NRZ encoding, a second low data rate digital signal at a data rate of R is encoded using AMI encoding, and a third high data rate digital signal at a data rate of 4R is encoded using Manchester encoding. The PSD for the polar NRZ encoded signal is shown as curve 902, the PSD for the AMI encoded signal is shown as curve 904, and the PSD for the Manchester encoded signal is shown as curve 906. As can be seen from FIG. 9, the PSDs of the three encoded signals are substantially orthogonal in the frequency domain. All three signals have high PSD's in different frequency ranges. Further, in the frequency range in which one of the signals has a high PSD, the other signals have low PSD's. As a result, the three signals may be transmitted over the same physical medium with little or no interference.

Figure 10:
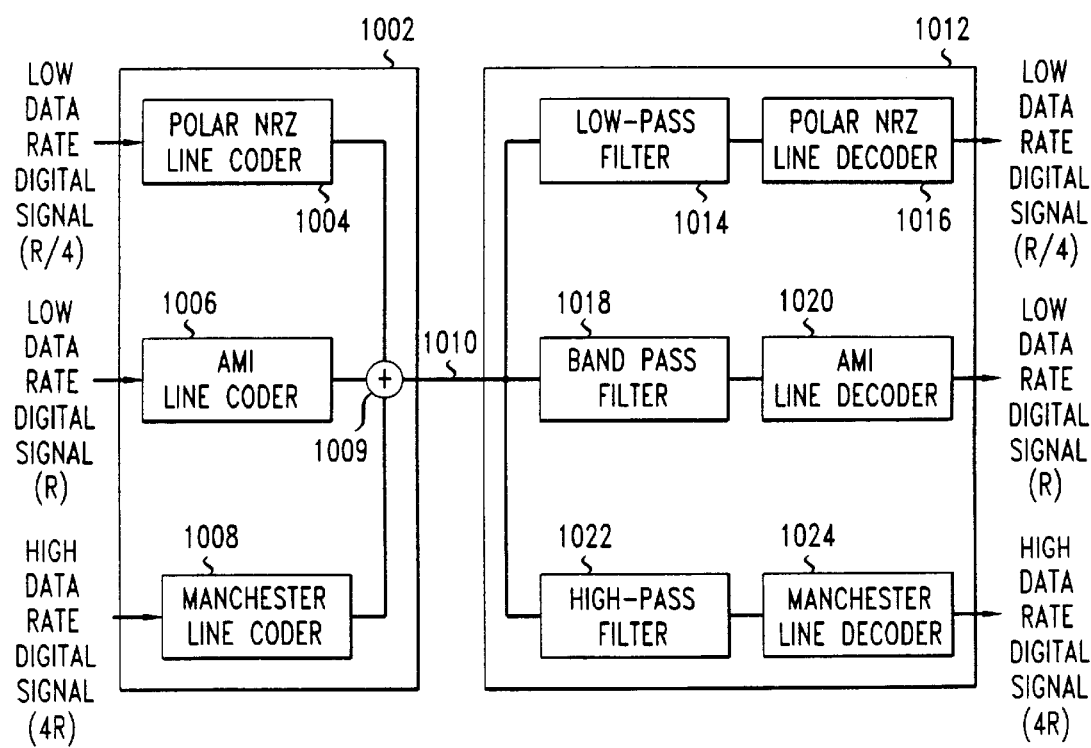
FIG. 10 shows a system for transmitting and receiving digital signals in accordance with one embodiment of the invention.

One embodiment of a system for practicing the invention as described in conjunction with FIG. 9, is shown in FIG. 10. A transmitter 1002 receives a first low data rate (R/4) digital signal, a second low data rate (R) digital signal, and a third high data rate (4R) digital signal. The first low data rate digital signal is encoded by polar NRZ line coder 1004, the second low data rate digital signal is encoded by AMI line coder 1006 and the third high data rate digital signal is encoded by Manchester line coder 1008. The three encoded signals are combined by combiner 1009 and transmitted via wire 1010 to receiver 1012. At the receiver 1012 the signal is split and provided to a low-pass filter 1014, a band pass filter 1018, and a high-pass filter 1022. The low pass filter 1014, band pass filter 1018, and high pass filter 1022 are configured to pass the polar NRZ encoded signal, the AMI encoded signal, and the Manchester encoded signal respectively. Thus, the output of the low-pass filter 1014 is provided to a polar NRZ line decoder 1016 for decoding and the polar NRZ line decoder 1016 outputs the first low data rate digital signal. The output of the band pass filter 1018 is provided to an AMI line decoder 1020 for decoding and the AMI line decoder 1020 outputs the second low data rate digital signal. The output of the high pass filter 1022 is provided to a Manchester line decoder 1024 for decoding and the Manchester line decoder 1024 outputs the third high data rate digital signal.

It is noted that FIGS. 6 and 10 are functional block diagrams of apparatuses in accordance with various embodiments of the invention. Given the figures and the description herein, one skilled in the art could readily implement the invention. For example, the line coders and line decoders shown in FIGS. 6 and 10 could be implemented using programmable processors in conjunction with appropriate software for performing the coding and decoding functions. Alternatively, the line coders and decoders could be implemented using hardware, or some combination of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for processing a received signal comprising the steps of:

receiving a combined signal comprising a plurality of line encoded digital signals wherein said plurality of digital signals includes at least two digital signals having different data rates and wherein said plurality of line encoded signals includes a first low data rate digital signal encoded using polar NRZ line encoding and a second high data rate digital signal encoded using Manchester line encoding;

extracting each of said plurality of line encoded signals from said combined signal; and decoding each of said plurality of line encoded signals to generate a plurality of line decoded digital signals.

2. A method for processing a received signal comprising the steps of:

receiving a combined signal comprising a plurality of line encoded digital signals wherein said plurality of digital signals includes at least two digital signals having different data rates and wherein said plurality of line encoded signals include a first low data rate digital signal encoded using polar NRZ line encoding, a second high data rate digital signal encoded using Manchester line encoding, and a third low data rate digital signal encoded using alternate mark inversion line encoding;

extracting each of said plurality of line encoded signals from said combined signal; and decoding each of said plurality of line encoded signals to generate a plurality of line decoded digital signals.

3. A method for processing a received signal comprising the steps of:

receiving a combined signal comprising a plurality of line encoded digital signals wherein said plurality of digital signals includes at least two digital signals having different data rates:

extracting said plurality of line encoded signals from said combined signal wherein said step of extracting comprises the step of filtering said combined signal using a low pass filter and a high pass filter;

providing said low pass filtered signal to a first line decoder;

providing said high pass filtered signal to a second line decoder; and decoding each of line decoded said plurality of line encoded signals to generate a plurality of digital signals.

4. The method of claim 3 wherein:

said first line decoder is a polar NRZ line decoder; and said second line decoder is a Manchester line decoder.

5. A method for processing a received signal comprising the steps of:

receiving a combined signal comprising a plurality of line encoded digital signals wherein said plurality of digital signals includes at least two digital signals having different data rates;

extracting each of said plurality of line encoded signals from said combined signal wherein said step of extracting comprises the step of filtering said combined signal using a low pass filter, a high pass filter, and a band pass filter;

providing said low pass filtered signal to a first line decoder;

providing said high pass filtered signal to a second line decoder;

providing said band pass filtered signal to a third line decoder and;

decoding each of said plurality of line encoded signals to generate a plurality of line decoded digital signals.

6. The method of claim 5 wherein:

said first line decoder is a polar NRZ line decoder;

said second line decoder is a Manchester line decoder; and said third line decoder is an alternate mark inversion line decoder.

7. A method for processing a received signal comprising the steps of:

receiving a combined signal;

extracting first and second line encoded signals from said combined signal by filtering said combined signal using a low pass filter and a high pass filter;

providing said low pass filtered signal to a first line decoder;

providing said high pass filtered signal to a second line decoder;

decoding said first line encoded signal to generate a first digital signal; and decoding said second line encoded signal to generate a second digital signal.

8. The method of claim 7 wherein:

said first encoded signal was encoded using polar NRZ line encoding; and said second encoded signal was encoded using Manchester line encoding.

9. The method of claim 7 further comprising the steps of:

extracting a third line encoded signal from said combined signal; and decoding said third line encoded signal to generate a third digital signal.

10. Apparatus for processing a received signal comprising:

a plurality of filters for extracting a plurality of line encoded signals from said received signal wherein said plurality of filters comprises:
a low pass filter for extracting a first encoded signal;
a high pass filter for extracting a second encoded signal; and a plurality of line decoders for decoding each of said plurality of line encoded signals to generate a plurality of line decoded digital signals wherein said plurality of line decoders comprises:
a polar NRZ line decoder for decoding said first encoded signal;
a Manchester line decoder for decoding said second encoded signal.

11. The apparatus of claim 10 wherein:

said plurality of filters further comprises:
a band pass filter for extracting a third encoded signal;

said plurality of line decoders further comprises:
an alternate mark inversion line decoder for decoding said third encoded signal.

12. A receiver for processing a received combined signal comprising;

a first filter for extracting a first line encoded low data rate signal from said combined signal;

a second filter for extracting a second high data rate line encoded signal from said combined signal;

a first line decoder for decoding said first line encoded signal to generate a first low data rate digital signal; and a second line decoder for decoding said second line encoded signal to generate a second high data rate digital signal.

13. The receiver of claim 12 wherein:

said first filter is a low pass filter;

said second filter is a high pass filter;

said first line decoder is a polar NRZ line decoder; and said second line decoder is a Manchester line decoder.

14. The receiver of claim 12 further comprising:

a third filter for extracting a third low data rate line encoded signal from said combined signal;

a third line decoder for decoding said third line encoded signal to generate a third low data rate digital signal.

15. The receiver of claim 14 wherein:

said third filter is a band pass filter; and said third line decoder is an alternate mark inversion line decoder.

16. Apparatus for processing a received combined signal comprising:

means for extracting a plurality of line encoded signals from said combined signal wherein said plurality of digital signals includes at least two digital signals having different data rates wherein said plurality of line encoded signals includes a first signal encoded using polar NRZ line encoding and a second signal encoded using Manchester line encoding, and wherein said means for extracting comprises:
a low pass filter for extracting said polar NRZ encoded signal; and
a high pass filter for extracting said Manchester encoded signal; and means for line decoding said plurality of line encoded signals to generate a plurality of line decoded digital signals said means for line decoding comprises:
a polar NRZ line decoder for decoding said NRZ encoded signal; and
a Manchester line decoder for decoding said Manchester encoded signal.

* * * * *